(12) United States Patent
Geng et al.

(10) Patent No.: US 11,360,352 B2
(45) Date of Patent: Jun. 14, 2022

(54) DISPLAY PANEL, DISPLAY APPARATUS AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Weibiao Geng, Beijing (CN); Hetao Wang, Beijing (CN); Rui Guo, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/358,343

(22) Filed: Jun. 25, 2021

(65) Prior Publication Data

US 2022/0155642 A1  May 19, 2022

(30) Foreign Application Priority Data

Nov. 17, 2020 (CN) .......................... 202011289673.5

(51) Int. Cl.
*G02F 1/1335* (2006.01)
*G09G 3/36* (2006.01)
*F21V 33/00* (2006.01)
*F21Y 113/13* (2016.01)

(52) U.S. Cl.
CPC .... *G02F 1/133612* (2021.01); *F21V 33/0052* (2013.01); *G09G 3/3688* (2013.01); *F21Y 2113/13* (2016.08)

(58) Field of Classification Search
CPC .......... G02F 1/133612; F21V 33/0052; G09G 3/3688; F21Y 2113/13
See application file for complete search history.

(56) References Cited

U.S. PATENT DOCUMENTS

| 2007/0109468 | A1* | 5/2007 | Oku | G02F 1/133514 349/110 |
| 2016/0041424 | A1* | 2/2016 | Guo | G09G 3/2003 345/694 |
| 2019/0326364 | A1* | 10/2019 | Chai | H01L 27/3216 |
| 2020/0142265 | A1* | 5/2020 | Zhao | G02F 1/134336 |

* cited by examiner

*Primary Examiner* — Evan P Dzierzynski
(74) *Attorney, Agent, or Firm* — Calfee, Halter & Griswold LLP

(57) ABSTRACT

The present disclosure relates to a display panel, a display apparatus and a display device, and relates to the field of display technology. The display panel of the present disclosure includes a display area, the display area includes an edge area and a central area distributed along a row direction; the display area has a plurality of pixel areas distributed in an array in the central area and the edge area, each of the pixel areas being provided with a plurality of sub-pixels, wherein the pixel area in the central area is a first pixel area, and the sub-pixels in the first pixel area are first sub-pixels; the pixel area in the edge area is a second pixel area, and the sub-pixels in the second pixel area are second sub-pixels.

20 Claims, 2 Drawing Sheets

DISPLAY PANEL, DISPLAY APPARATUS AND DISPLAY DEVICE

RELATED APPLICATIONS

This application claims priority to Chinese Application No. 202011289673.5, filed on Nov. 17, 2020, the entire disclosure of which is incorporated herein by reference.

TECHNICAL FIELD

The present disclosure relates to the field of display technology, and in particular, to a display panel, a display apparatus, and a display device.

BACKGROUND

At present, liquid crystal display apparatuses have been widely used in various electronic devices, which generally include a liquid crystal display panel and a backlight module. The liquid crystal display panel modulates light emitted by the backlight module to display images. However, when the existing liquid crystal display apparatus displays a monochrome picture in a single color, the edge of the displayed picture is prone to generating sawtooth phenomenon, which affects the viewing effect. Especially for the screen formed by splicing multiple liquid crystal display apparatuses, the entire picture is formed by splicing the pictures of multiple liquid crystal display apparatuses. The liquid crystal display apparatuses often need to display monochrome pictures, in order to splice the entire picture. At this time, if the edge of the picture of each liquid crystal display apparatus has sawtooth phenomenon, it will seriously affect the entire picture.

It should be noted that the information disclosed in the above BACKGROUND is only used to enhance the understanding of the background of the present disclosure, and therefore may include information that does not constitute the prior art known to those of ordinary skill in the art.

SUMMARY

The present disclosure provides a display panel, a display apparatus and a display device, which can reduce the sawtooth phenomenon at the edge of the picture.

According to one aspect of the present disclosure, there is provided a display panel, including a display area, the display area including an edge area and a central area distributed along a row direction; the display area having a plurality of pixel areas distributed in an array in the central area and the edge area, each of the pixel areas being provided with a plurality of sub-pixels, wherein the pixel area in the central area is a first pixel area, and the sub-pixels in the first pixel area are first sub-pixels; the pixel area in the edge area is a second pixel area, and the sub-pixels in the second pixel area are second sub-pixels;

a length of the second sub-pixel in a column direction is smaller than a length of the first sub-pixel in the column direction, and an amount of the second sub-pixels located in the same column is greater than an amount of the first sub-pixels located in the same column;

a distance between any two second sub-pixels with the same color in the second sub-pixels of the same column is smaller than a distance between any two first sub-pixels with the same color in the first sub-pixels of the same column.

In an exemplary embodiment of the present disclosure, a plurality of sub-pixels having a color different from a target color exists between two adjacent sub-pixels of the target color in the sub-pixels of any column;

the first pixel area is provided with one row of the first sub-pixels; the second pixel area is provided with N rows of the second sub-pixels; and N is a positive integer greater than 1.

In an exemplary embodiment of the present disclosure, a scan line extending in a row direction is provided between the pixel areas of two adjacent rows, and each of the sub-pixels in the pixel area of the same row is connected to the same scan line.

In an exemplary embodiment of the present disclosure, in any of the second pixel areas, one row of the second sub-pixels is connected to one scan line, and the other N−1 rows of the second sub-pixels are connected to the scan line through N−1 connection lines.

In an exemplary embodiment of the present disclosure, at least one data line extending in a column direction is provided between the sub-pixels of two adjacent columns, and at least a part of the sub-pixels of the same column is connected to the same data line.

In an exemplary embodiment of the present disclosure, N=2;

the i-th sub-pixel and the (i+2)-th sub-pixel in the sub-pixels of the same column are connected to one data line, and the (i+1)-th sub-pixel and the (i+3)-th sub-pixel are connected to another data line, and i is a positive integer;

any data line connecting the second sub-pixels is only connected to a part of the second sub-pixels in the second sub-pixels of one column.

In an exemplary embodiment of the present disclosure, N=3;

in the second sub-pixels of the same column, second sub-pixels with the same color are connected to the same data line, and second sub-pixels with different colors are connected to different data lines;

any data line connecting the second sub-pixels is only connected to second sub-pixels of one color in the second sub-pixels of one column.

In an exemplary embodiment of the present disclosure, each of the second pixel areas is provided with three columns of the second sub-pixels.

In an exemplary embodiment of the present disclosure, an amount of the edge areas is two, and they are distributed at two sides of the central area along a row direction, and an amount of the second sub-pixels of the two edge areas is the same.

In an exemplary embodiment of the present disclosure, two adjacent sub-pixels in the sub-pixels of any column have different colors.

In an exemplary embodiment of the present disclosure, two adjacent sub-pixels in the sub-pixels of the same row have different colors.

According to one aspect of the present disclosure, there is provided a display apparatus, including:

any one of the display panels described above; and a backlight module, arranged at a backlight side of the display panel, wherein the backlight module has a light-emitting part and a backlight frame surrounding the light-emitting part; the backlight frame is attached to the display panel, and an orthographic projection of the backlight frame on the display panel covers a part of the edge area.

According to one aspect of the present disclosure, there is provided a display device, including a plurality of display apparatuses spliced in an array described in any one of the above.

In the display panel, display apparatus, and display device of the present disclosure, the length of the second sub-pixel in the column direction is smaller than the length of the first sub-pixel in the column direction, and the number of second sub-pixels in the same column is greater than the number of first sub-pixels in the same column. As a result, within the same area, the density of the sub-pixels in the edge area is greater than the density of the sub-pixels in the central area. At the same time, the distance between any two second sub-pixels with the same color in the second sub-pixels of the same column is smaller than the distance between any two first sub-pixels with the same color in the first sub-pixels in the same column. During the monochrome display, if the backlight frame blocks some of the sub-pixels in the edge area, and the blocked area extends non-linearly, since the number of two light-emitting sub-pixels in the same column in the edge area increases, the distance between two adjacent light-emitting sub-pixels is shortened, it can weaken the sawtooth phenomenon in the edge area and improve the display effect.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments in accordance with the disclosure, and explain the principle of the disclosure together with the specification. The drawings in the following description are only some embodiments of the present disclosure. For those of ordinary skill in the art, other drawings can be obtained based on these drawings without creative work.

Figure 1:
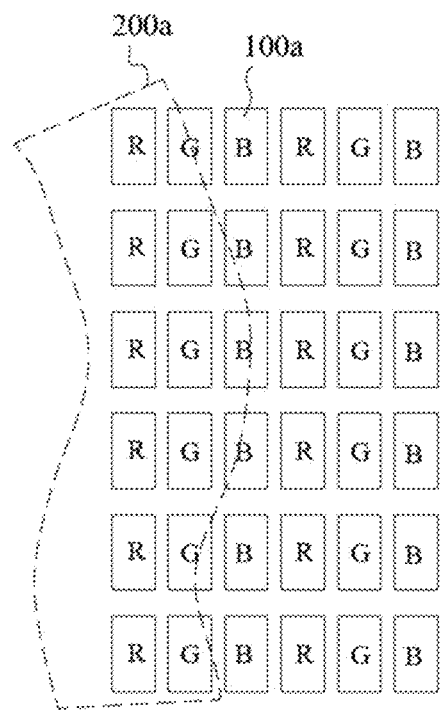
FIG. 1 is a schematic diagram of a backlight frame covering sub-pixels in the related art.
Figure 2:
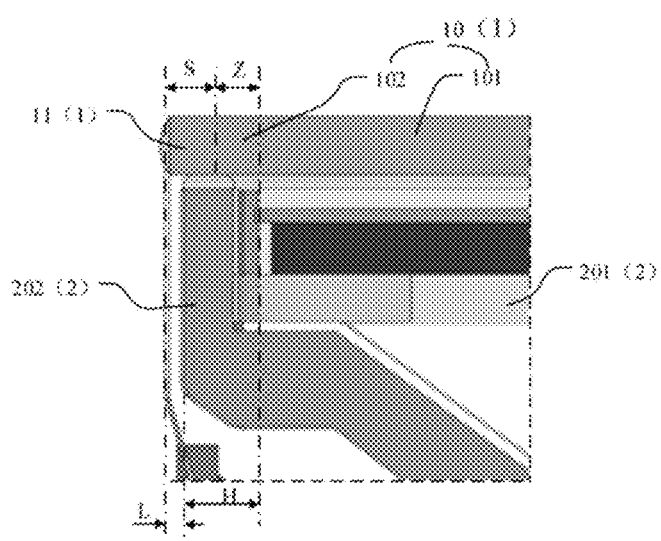
FIG. 2 is a schematic diagram of an embodiment of the display apparatus of the present disclosure.
Figure 3:
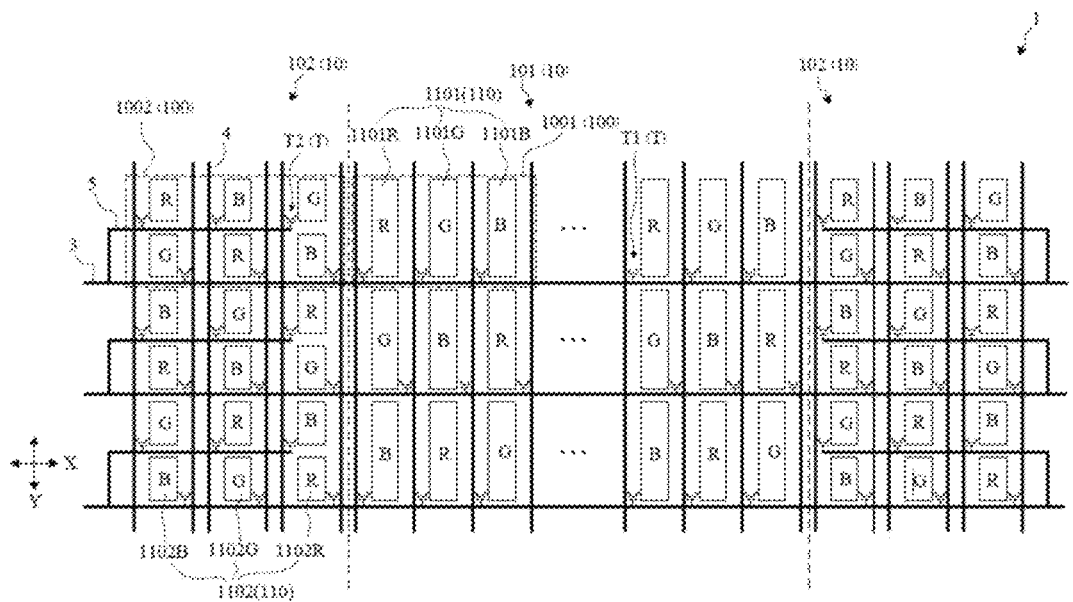
FIG. 3 is a schematic diagram of an embodiment of the display panel of the present disclosure.
Figure 4:
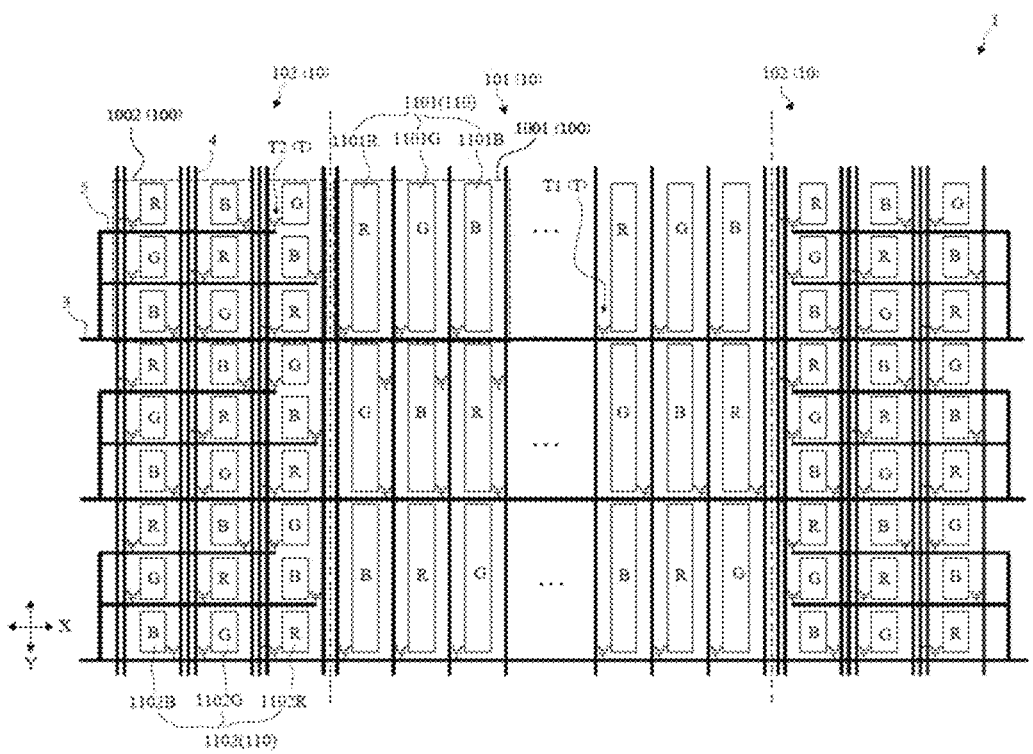
FIG. 4 is a schematic diagram of another embodiment of the display panel of the present disclosure.

REFERENCE NUMERALS in FIG. 1: 100a, sub-pixel; 200a, backlight frame;

in FIG. 2-FIG. 4: 1. display panel; 11, frame; 10, display area; 100, pixel area; 110, sub-pixel; 101, central area; 1001, first pixel area; 1101, first sub-pixel; 1101R, red first sub-pixel; 1101G, green first sub-pixel; 1101B, blue first sub-pixel; 102, edge area; 1002, second pixel area; 1102, second sub-pixel; 1102R, red second sub-pixel; 1102G, green second sub-pixel; 1102B, blue second sub-pixel; 2. backlight module; 201, light-emitting part; 202, backlight frame; 3. scan line; 4. data line; 5. connection line.

DETAILED DESCRIPTION

Example embodiments will now be described more fully with reference to the accompanying drawings. However, the example embodiments can be implemented in various forms, and should not be construed as being limited to the embodiments set forth herein; on the contrary, these embodiments are provided so that the present disclosure will be comprehensive and complete, and fully convey the concept of the example embodiments to those skilled in the art. The same reference numerals in the figures indicate the same or similar structures, and thus their detailed descriptions will be omitted. In addition, the drawings are only schematic illustrations of the present disclosure, and are not necessarily drawn to scale.

The terms "a", "an", "the", "said" and "at least one" are used to indicate the presence of one or more elements/components/etc.; the terms "including" and "having" are used to indicate open-ended inclusive meaning and mean that in addition to the listed elements/components/etc., there may be other elements/components/etc.; the terms "first", "second", etc. are only used as marks, not to limit the number of the objects.

In the embodiments of the present disclosure, the row direction in FIGS. 3 and 4 is the X direction, and the column direction is the Y direction. However, the row direction and the column direction in the present disclosure only refer to two directions perpendicular to each other, and are not limited to the X and Y directions in FIGS. 3 and 4. Those skilled in the art can know that as the display panel rotates, the actual orientation of the row direction and the column direction may change.

In the related art, the liquid crystal display apparatus may include a liquid crystal display panel and a backlight module.

In the embodiment, the liquid crystal display panel includes an array substrate and a color film substrate arranged opposite to each other to form a liquid crystal cell. In the liquid crystal cell, a liquid crystal layer is filled between the array substrate and the color film substrate. A first polarizer is provided on the array substrate, and the color film substrate has a filter layer that is used to change the color of light, and a second polarizer is arranged on the color film substrate. Polarization directions of the first polarizer and the second polarizer are perpendicular to each other. The backlight module is arranged at the non-display side of the liquid crystal display panel and is used to provide a flat light source for the display of the liquid crystal display panel. Under the action of the driving electric field formed between the pixel electrode of the sub-pixel arranged on the array substrate and the common electrode arranged on the array substrate or the common electrode arranged on the color film substrate, liquid crystal molecules of the liquid crystal layer are deflected, and the liquid crystal molecules may control the polarization direction of the light passing through the liquid crystal layer after being deflected by a predetermined angle, and may control the light transmittance under the cooperation of the first polarizer and the second polarizer, that is, the light can be modulated, to achieve the gray-scale display.

A plurality of pixels is formed in the liquid crystal display panel, each pixel includes a plurality of sub-pixels that emit light independently. Each sub-pixel includes a pixel electrode and a common electrode corresponding to the pixel electrode, a liquid crystal layer, a filter layer and other structures. That is, each sub-pixel can emit monochromatic but variable gray-scale light by modulating the light of the backlight module.

The backlight module can be a direct type backlight module or an edge type backlight module. The direct type backlight module is taken as an example. It may include a plurality of backlight units distributed in an array. The backlight unit may be LEDs (light emitting diodes). The light emitted by these point light sources is diffused and homogenized before being incident in the LCD panels for display.

The liquid crystal display panel includes a display substrate and a frame surrounding the display substrate. The backlight module includes a light-emitting part and a backlight frame surrounding the light-emitting part. As shown in FIG. 1, during the assembly, the backlight module and the liquid crystal display panel need to be attached together by gluing. However, due to the narrow frame of the liquid crystal display panel, in order to make the bonding stronger, it is necessary to adhere the backlight frame 200a to the inner side of the frame of the liquid crystal display panel, that is, to adhere to the edge of the display substrate, to increase the contact area, but this will block the sub-pixels 100a on the edge of the display substrate, and the blocked area usually extends non-linearly. During the monochrome display, it will cause the edge of the picture to generating sawtooth phenomenon, which will affect the display effect.

The embodiments of the present disclosure provide a display panel, which can be a liquid crystal display panel and can be used in a liquid crystal display apparatus. The specific structure of the liquid crystal display panel may refer to the above description. As shown in FIGS. 2 and 3, the display apparatus may include a display panel 1 and a backlight module 2.

In the embodiment, the display panel 1 has a display area 10 and a frame 11 cladding the edge of the display area 10. The frame 11 has a width of S. The backlight module 2 includes a light-emitting part 201 and a backlight frame 202 surrounding the light-emitting part 201. The distance between the outer side surface of the backlight frame 202 and the outer side surface of the frame 11 is L, the width of the backlight frame 202 is H, and the width of the area of the backlight frame 202 shielded inside the frame 11 is Z, Z=L+H−S. Exemplarily, L may be 0.25 mm, H may be 1 mm, S may be 0.87 mm, and Z may be 0.38 mm.

As shown in FIGS. 2 to 4, the display panel 1 may include a display area 10. The display area 10 includes an edge area 102 and a central area 101 distributed along the row direction. The display area 10 has a plurality of pixel areas 100 distributed in an array in the central area 101 and the edge area 102, and each pixel area 100 is provided with a plurality of sub-pixels 110.

For ease of description, the pixel area 100 in the central area 101 can be defined as the first pixel area 1001, the pixels in the first pixel area 1001 can be defined as the first pixels, and the sub-pixels 110 in the first pixel area 1001 can be defined as the first sub-pixels 1101. At the same time, the pixel area 100 of the edge area 102 is defined as the second pixel area 1002, the pixels of the second pixel area 1002 are defined as the second pixels, and the sub-pixels 110 of the second pixel area 1002 are defined as the second sub-pixels 1102.

A length of the second sub-pixel 1102 in a column direction is smaller than a length of the first sub-pixel 1101 in the column direction, and an amount of the second sub-pixels 1102 located in the same column is greater than an amount of the first sub-pixels 1101 located in the same column.

A distance between any two second sub-pixels 1102 with the same color in the second sub-pixels 1102 of the same column is smaller than a distance between any two first sub-pixels 1101 with the same color in the first sub-pixels 1101 of the same column.

In the display panel of the present disclosure, during the monochrome display, if the backlight frame 202 blocks some of the sub-pixels 110 in the edge area 102, and the blocked area extends non-linearly, since the number of two light-emitting sub-pixels 110 in the same column in the edge area 102 increases, the distance between two adjacent light-emitting sub-pixels 110 is shortened (compared with the sub-pixels 110 in the central area 101), it can weaken the sawtooth phenomenon in the edge area 102 and improve the display effect.

As shown in FIGS. 2 to 4, the display panel 1 of the present disclosure may be a liquid crystal display panel, and its structure is not described in detail herein. The display panel 1 may include a display area 10.

In the embodiment, the display area 10 is used to display an image, and has a plurality of pixel areas 100 distributed in an array. Each pixel area 100 has the same size, each pixel area 100 is provided with at least one pixel, and each pixel includes a plurality of sub-pixels 110. For example, each pixel includes three sub-pixels 110 located in the same row, and the light-emitting colors thereof may include red, green, and blue. Through the light emission of each sub-pixel 110, an image can be displayed.

The display area 10 can be divided into a central area 101 and an edge area 102. The edge area 102 is an area bonded to the backlight frame 202, but the backlight frame 202 covers at most a part of the edge area 102, rather than completely covers the edge area 102. The edge area 102 and the central area 101 are distributed along the row direction, and the length of them two along the column direction is the same. The width of the edge area 102 in the row direction is smaller than the width of the central area 101 in the row direction, so the area of the edge area 102 is smaller than that of the central area 101. For example, the number of the edge areas 102 is two, and they are distributed at two sides of the central area 101 along the row direction. At the same time, the edge area 102 and the central area 101 both have the aforementioned pixel area 100. Since the area of the edge area 102 is smaller than the area of the central area 101, the number of pixel areas 100 in the edge area 102 is smaller than the number of pixel areas 100 in the central area 101.

The width of each sub-pixel 110 in the row direction is the same. For example, the width may be 0.21 mm, and the width may also be other values.

In order to prevent the edge of the picture from generating sawteeth, that is, to prevent the edge area 102 from generating sawteeth therein, the length of the second sub-pixel 1102 in the column direction may be smaller than the length of the first sub-pixel 1101 in the column direction, and the number of the two sub-pixels 1102 located in the same column may be greater than the number of the first sub-pixels 1101 located in the same column, so that the density of the sub-pixels 110 in the edge area 102 is greater than the density of the sub-pixels 110 in the central area 101. At the same time, the distance between any two second sub-pixels 1102 with the same color in the second sub-pixels 1102 of the same column is smaller than the distance between any two first sub-pixels 1101 with the same color in the first sub-pixels 1101 of the same column, even if the backlight frame 202 extends in a non-straight line, since the distance between two adjacent second sub-pixels 1102 with the same color in the same column is relatively small (relative to the distance between two adjacent first sub-pixels 1101 with the same color in the same column), the distance between the sawteeth is reduced, thereby the sawtooth phenomenon is weakened, making the sawteeth difficult to be seen, and improving the picture effect.

As for the edge area 102, the sub-pixels 110 in the same column can have multiple colors instead of one kind of color, and the sub-pixels 110 of each color are evenly distributed, so that the sub-pixels 110 of each color are blocked by the backlight frame 202 in an approximately equal probability, and the sub-pixels 110 that are not blocked are not the sub-pixels 110 of the same color. When a non-monochromatic picture is displayed, monochromatic stripes can be avoided at the edge of the picture. For example, the colors of two adjacent sub-pixels 110 in any column of sub-pixels 110 can be different, and the colors of two adjacent sub-pixels 110 in the same row of sub-pixels 110 can be different. In the edge area 102, the uniformity of the probability that the sub-pixels 110 of different colors are blocked by the backlight frame 202 is improved, which further prevents monochromatic stripes from appearing at the edge of the picture. The color order of the sub-pixels 110 in the central area 101 in the row direction and the column direction may also be distributed according to the color order of the edge area 102.

As shown in FIG. 3 and FIG. 4, the manner of realizing the length, number, and distance of the above sub-pixels 110 will be exemplarily described below.

In some embodiments of the present disclosure, as for the entire display area 10, there are a plurality of sub-pixels 110 having a color different from the target color between two adjacent sub-pixels 110 of the target color in the sub-pixels 110 of any column. The target color refers to the light-emitting color of the sub-pixel 110, which may be any of the light-emitting colors of the sub-pixels 110.

For example, each pixel includes three sub-pixels 110 of red, green and blue. In the first sub-pixels 1101 of any column, there are two first sub-pixels 1101 of other colors between two adjacent first sub-pixels 1101 of the same color. In any column of the second sub-pixel 1102, there are two second sub-pixels 1102 of other colors between two adjacent second sub-pixels 1102 of the same color. For example, there is one blue first sub-pixel 1101B and one green first sub-pixel 1101G between two adjacent red first sub-pixels 1101R in the first sub-pixels 1101 of the same column. There is one blue second sub-pixel 1102B and one green second sub-pixel 1102G between two adjacent red second sub-pixels 1102R in the second sub-pixels 1102 of the same column.

Since the length of the second sub-pixel 1102 in the column direction is smaller than the length of the first sub-pixel 1101 in the column direction, the distance between any two second sub-pixels 1102 with the same color in the second sub-pixels 1102 of the same column is smaller than the distance between any two first sub-pixels 1101 with the same color in the first sub-pixels 1101 of the same column. Thereby, the sawtooth phenomenon can be weakened.

Further, each first pixel area 1001 is provided with one row of first pixels, and the first pixel includes three first sub-pixels 1101 of red, green and blue distributed along the row direction. Each second pixel area 1002 is provided with N rows of second pixels, and each second pixel includes three second sub-pixels 1102 of red, green and blue distributed along the row direction. N is a positive integer greater than 1. The number of second pixels in each row of second pixels may be one or more, depending on the width of the edge area 102 in the row direction.

As shown in FIG. 3, in the first type of embodiments of the present disclosure, in the central area 101, each first pixel area 1001 is provided with a row of first sub-pixels 1101, and each row of first sub-pixels 1101 can be divided into multiple first pixels. Each first pixel may include a red first sub-pixel 1101R, a blue first sub-pixel 1101B, and a green first sub-pixel 1101G. At the same time, N=2, that is, each second pixel area 1002 has two rows of second sub-pixels 1102, each row of second sub-pixels 1102 constitutes a second pixel, and the second pixel includes a red second sub-pixel 1102R, a blue second sub-pixel 1102B, and a green second sub-pixel 1102G. Each second pixel area 1002 is provided with three columns of second sub-pixels 1102.

Further, as shown in FIGS. 3 and 4, in the second pixel area 1002 in the same column, the second sub-pixels 1102 of two adjacent second pixel areas 1002 have the same color distribution order in the row direction, and have the same color distribution order in the column direction. That is to say, in the edge area 102, the color distribution of the second sub-pixels 1102 of a second pixel area 1002 is periodic, and the color distribution is repeated along the column direction, to obtain a column of the second pixel area 1002 and its second sub-pixels 1102.

In addition, if the number of the edge areas 102 is two and they are located at two sides of the central area 101, the number of the second sub-pixels 1102 of the two edge areas 102 can be the same.

As shown in FIG. 4, in the second type of embodiments of the present disclosure, the distribution manner of the first sub-pixels 1101 in the central area 101 can refer to the above-mentioned first type of embodiments which will not be described in detail herein. At the same time, N=3, that is, each second pixel area 1002 has three rows of second sub-pixels 1102, each row of second sub-pixels 1102 constitutes a second pixel, and the second pixel includes a red second sub-pixel 1102R, a blue second sub-pixel 1102B, and a green second sub-pixel 1102G. Each second pixel area 1002 is provided with three columns of second sub-pixels 1102.

The driving mode of the sub-pixel 110 will be described below:

As shown in FIGS. 3 and 4, the display panel 1 is provided with a plurality of pixel circuits. Each sub-pixel includes a pixel circuit. The pixel circuit includes a driving transistor T connected to the pixel electrode of the sub-pixel 110 to which it belongs, and each pixel circuit outputs a driving signal to each sub-pixel 110 in one-to-one correspondence, so that it emits light. The driving transistor T of the first sub-pixel 1101 is a first driving transistor T1, and the driving transistor T of the second sub-pixel 1102 is a second driving transistor T2.

A scan line 3 extending in the row direction may be provided between pixel areas 100 of two adjacent rows, and each sub-pixel 110 in the pixel area 100 of the same row is connected to the same scan line 3. The connection of the sub-pixel 110 to the scan line 3 means that the gate of the driving transistor T of the sub-pixel 110 is connected to the scan line 3. At the same time, at least one data line 4 extending along the column direction is provided between sub-pixels 110 of two adjacent columns, and each sub-pixel 110 is connected to a data line 4. The connection of the sub-pixel 110 to the data line 4 means that the source or drain of the driving transistor T of the sub-pixel 110 is connected to the data line 4. When the sub-pixel is driven to emit light, in addition to controlling the backlight module 2 to emit light, the scan line 3 can output scan signals to the sub-pixels 110 connected thereto, and control on and off of the driving transistor T, and a data signal is output to the connected sub-pixel 110 through the data line 4, thereby driving the sub-pixel 110 to emit light or turn off, and adjusting the gray scale of the light emission through the change of the data signal.

In order to facilitate the driving, all the second sub-pixels 1102 in any second pixel area 1002 can be connected to the same scan line 3, and at the same time, the scan line 3 is also connected to the first sub-pixels 1101 in the first pixel area 1001 that is in the same row with the second pixel area 1002.

For example, in any second pixel area 1002, there is a row of second sub-pixels 1102 directly connected to a scan line 3. For example, the row of second sub-pixels 1102 closest to the scan line 3 is directly connected to the scan line 3, and the other N−1 rows of second sub-pixels 1102 are connected to the scan line 3 through N−1 connecting lines 5. That is, the second sub-pixels 1102 in the same row are connected to the same connecting line 5, and the second sub-pixels 1102 of different rows are connected to different connecting lines 5.

At least one data line 4 extending along the column direction is provided between sub-pixels 110 of two adjacent columns, and at least a part of the sub-pixels 110 in the same column of sub-pixels 110 are connected to the same data line 4.

For example, as shown in FIG. 3, based on the first type of embodiments above, in some embodiments of the present disclosure, N=2, in the column direction, the i-th sub-pixel 110 and the (i+2)-th sub-pixel 110 in the sub-pixels 110 of the same column are connected to one data line 4, and the (i+1)-th sub-pixel 110 and the (i+3)-th sub-pixel 110 are connected to another data line 4, and i is a positive integer. Taking i=3 as an example, in the column direction from one side of the display panel 1 to the opposite side (for example, from the top to the bottom in FIG. 3), the third sub-pixel 110 and the fifth sub-pixel 110 in the same column of sub-pixels 110 are connected to a data line 4, and the fourth sub-pixel 110 and the sixth sub-pixel 110 are connected to another data line 4.

Any data line 4 connecting the second sub-pixels 1102 is only connected to a part of the second sub-pixels 1102 in a column of the second sub-pixels 1102.

As shown in FIG. 4, based on the second type of embodiments above, in some embodiments of the present disclosure, N=3; in the column direction, in the second sub-pixels 1102 of the same column, second sub-pixels 1102 with the same color are connected to the same data line 4, and second sub-pixels 1102 with different colors are connected to different data lines 4. The second sub-pixel 1102 in the same column includes second sub-pixels 1102 of red, green, and blue, and the second sub-pixels 1102 of the three colors are respectively connected to three different data lines 4. In addition, two or three columns of data lines 4 may be provided between the second sub-pixels 1102 of the same column and two adjacent columns.

Any data line 4 connecting the second sub-pixels 1102 is only connected to second sub-pixels 1102 of one color in the second sub-pixels 1102 of one column.

The embodiment of the present disclosure provides a display apparatus, including a display panel 1 and a backlight module 2.

The display panel 1 is the display panel 1 of any of the above-mentioned embodiments, and its structure can refer to the above-mentioned embodiment of the display panel 1 and will not be described in detail herein. The display panel 1 has a light emitting side and a backlight side opposite to each other.

The backlight module 2 is arranged on the backlight side of the display panel 1, and the backlight module 2 has a light-emitting part 201 and a backlight frame 202 surrounding the light-emitting part 201. The backlight frame 202 is attached to the display panel 1, and an orthographic projection of the backlight frame 202 on the display panel 1 extends to a part of the edge area 102. The outer edge of the backlight frame 202 is located inside the edge of the display panel 1.

For the beneficial effects of the display apparatus of the present disclosure, reference may be made to the above display panel embodiments, which will not be described in detail herein.

The embodiments of the present disclosure further provide a display device, which includes a plurality of display apparatuses spliced in an array described in any one of the above. For the structure and beneficial effects of the display apparatus, reference may be made to the foregoing embodiments, which will not be described in detail herein.

Those skilled in the art will easily think of other embodiments of the present disclosure after considering the specification and practicing the disclosure disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are only regarded as exemplary, and the true scope and spirit of the present disclosure are indicated by the appended claims.

What is claimed is:

1. A display panel, comprising a display area, the display area comprising an edge area and a central area distributed along a row direction; the display area having a plurality of pixel areas distributed in an array in the central area and the edge area, each of the pixel areas being provided with a plurality of sub-pixels,
   wherein the pixel area in the central area is a first pixel area, and the sub-pixels in the first pixel area are first sub-pixels; the pixel area in the edge area is a second pixel area, and the sub-pixels in the second pixel area are second sub-pixels;
   a length of the second sub-pixel in a column direction is smaller than a length of the first sub-pixel in the column direction, and an amount of the second sub-pixels located in the same column is greater than an amount of the first sub-pixels located in the same column;
   a distance between any two second sub-pixels with the same color in the second sub-pixels of the same column is smaller than a distance between any two first sub-pixels with the same color in the first sub-pixels of the same column.

2. The display panel according to claim 1, wherein a plurality of sub-pixels having a color different from a target color exist between two adjacent sub-pixels of the target color in the sub-pixels of any column;
   the first pixel area is provided with one row of the first sub-pixels; the second pixel area is provided with N rows of the second sub-pixels; and N is a positive integer greater than 1.

3. The display panel according to claim 2, wherein at least one data line extending in a column direction is provided between the sub-pixels of two adjacent columns, and at least a part of the sub-pixels of the same column is connected to the same data line.

4. The display panel according to claim 2, wherein N=2; the i-th sub-pixel and the (i+2)-th sub-pixel in the sub-pixels of the same column are connected to one data line, and the (i+1)-th sub-pixel and the (i+3)-th sub-pixel are connected to another data line, and i is a positive integer;

any data line connecting the second sub-pixels is only connected to a part of the second sub-pixels in the second sub-pixels of one column.

5. The display panel of claim 2, wherein N=3;
in the second sub-pixels of the same column, second sub-pixels with the same color are connected to the same data line, and second sub-pixels with different colors are connected to different data lines;
any data line connecting the second sub-pixels is only connected to second sub-pixels of one color in the second sub-pixels of one column.

6. The display panel according to claim 2, wherein each of the second pixel areas is provided with three columns of the second sub-pixels.

7. The display panel according to claim 2, wherein two adjacent sub-pixels in the sub-pixels of any column have different colors.

8. The display panel according to claim 7, wherein two adjacent sub-pixels in the sub-pixels of the same row have different colors.

9. The display panel according to claim 1, wherein a scan line extending in a row direction is provided between the pixel areas of two adjacent rows, and each of the sub-pixels in the pixel area of the same row is connected to the same scan line.

10. The display panel according to claim 9, wherein in any of the second pixel areas, one row of the second sub-pixels is connected to one scan line, and the other N−1 rows of the second sub-pixels are connected to the scan line through N−1 connection lines.

11. The display panel according to claim 1, wherein an amount of the edge areas is two, and they are distributed at two sides of the central area along a row direction, and an amount of the second sub-pixels of the two edge areas is the same.

12. A display apparatus, comprising:
a display panel, wherein the display panel comprises a display area, the display area comprising an edge area and a central area distributed along a row direction; the display area having a plurality of pixel areas distributed in an array in the central area and the edge area, each of the pixel areas being provided with a plurality of sub-pixels, wherein the pixel area in the central area is a first pixel area, and the sub-pixels in the first pixel area are first sub-pixels; the pixel area in the edge area is a second pixel area, and the sub-pixels in the second pixel area are second sub-pixels; a length of the second sub-pixel in a column direction is smaller than a length of the first sub-pixel in the column direction, and an amount of the second sub-pixels located in the same column is greater than an amount of the first sub-pixels located in the same column; a distance between any two second sub-pixels with the same color in the second sub-pixels of the same column is smaller than a distance between any two first sub-pixels with the same color in the first sub-pixels of the same column; and
a backlight module, arranged at a backlight side of the display panel, wherein the backlight module has a light-emitting part and a backlight frame surrounding the light-emitting part; the backlight frame is attached to the display panel, and an orthographic projection of the backlight frame on the display panel covers a part of the edge area.

13. The display apparatus according to claim 12, wherein a plurality of sub-pixels having a color different from a target color exist between two adjacent sub-pixels of the target color in the sub-pixels of any column; the first pixel area is provided with one row of the first sub-pixels; the second pixel area is provided with N rows of the second sub-pixels; and N is a positive integer greater than 1.

14. The display apparatus according to claim 12, wherein a scan line extending in a row direction is provided between the pixel areas of two adjacent rows, and each of the sub-pixels in the pixel area of the same row is connected to the same scan line.

15. The display apparatus according to claim 13, wherein N=2;
the i-th sub-pixel and the (i+2)-th sub-pixel in the sub-pixels of the same column are connected to one data line, and the (i+1)-th sub-pixel and the (i+3)-th sub-pixel are connected to another data line, and i is a positive integer;
any data line connecting the second sub-pixels is only connected to a part of the second sub-pixels in the second sub-pixels of one column.

16. The display apparatus of claim 13, wherein N=3;
in the second sub-pixels of the same column, second sub-pixels with the same color are connected to the same data line, and second sub-pixels with different colors are connected to different data lines;
any data line connecting the second sub-pixels is only connected to second sub-pixels of one color in the second sub-pixels of one column.

17. The display apparatus according to claim 13, wherein each of the second pixel areas is provided with three columns of the second sub-pixels.

18. The display apparatus according to claim 13, wherein at least one data line extending in a column direction is provided between the sub-pixels of two adjacent columns, and at least a part of the sub-pixels of the same column is connected to the same data line.

19. The display apparatus according to claim 14, wherein in any of the second pixel areas, one row of the second sub-pixels is connected to one scan line, and the other N−1 rows of the second sub-pixels are connected to the scan line through N−1 connection lines.

20. A display device, comprising a plurality of display apparatuses spliced in an array,
wherein the display apparatus comprises:
a display panel comprising a display area, the display area comprising an edge area and a central area distributed along a row direction; the display area having a plurality of pixel areas distributed in an array in the central area and the edge area, each of the pixel areas being provided with a plurality of sub-pixels, wherein the pixel area in the central area is a first pixel area, and the sub-pixels in the first pixel area are first sub-pixels; the pixel area in the edge area is a second pixel area, and the sub-pixels in the second pixel area are second sub-pixels; a length of the second sub-pixel in a column direction is smaller than a length of the first sub-pixel in the column direction, and an amount of the second sub-pixels located in the same column is greater than an amount of the first sub-pixels located in the same column; a distance between any two second sub-pixels with the same color in the second sub-pixels of the same column is smaller than a distance between any two first sub-pixels with the same color in the first sub-pixels of the same column; and
a backlight module, arranged at a backlight side of the display panel, wherein the backlight module has a light-emitting part and a backlight frame surrounding the light-emitting part; the backlight frame is attached to the display panel, and an orthographic projection of the backlight frame on the display panel covers a part of the edge area.

\* \* \* \* \*